US008969487B2

(12) United States Patent
Sambhy et al.

(10) Patent No.: US 8,969,487 B2
(45) Date of Patent: Mar. 3, 2015

(54) THERMALLY STABLE OLEOPHOBIC LOW ADHESION COATING FOR INKJET PRINTHEAD FACE

(75) Inventors: Varun Sambhy, Penfield, NY (US); Jin Wu, Pittsford, NY (US); Kock-Yee Law, Penfield, NY (US); Kyle B. Tallman, Farmington, NY (US); Darren Smith, Rochester, NY (US); Michael S. Roetker, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 273 days.

(21) Appl. No.: 13/557,466

(22) Filed: Jul. 25, 2012

(65) Prior Publication Data

US 2014/0030438 A1 Jan. 30, 2014

(51) Int. Cl.
*C08L 77/00* (2006.01)
*C08L 79/08* (2006.01)

(52) U.S. Cl.
USPC ................ 525/434; 106/287.23; 106/287.24; 106/287.25; 106/287.26; 525/420; 525/435; 525/436

(58) Field of Classification Search
CPC ...................... C08L 77/00; C08L 79/04–79/08
USPC ............ 525/420, 434, 435, 436; 106/287.23, 106/287.24, 287.25, 287.26
See application file for complete search history.

(56) References Cited

U.S. PATENT DOCUMENTS

| | | | | |
|---|---|---|---|---|
| 7,163,482 | B2 * | 1/2007 | Sarkar et al. | 475/159 |
| 2008/0008838 | A1 * | 1/2008 | Arpac et al. | 427/386 |
| 2012/0044298 | A1 | 2/2012 | Sambhy | |
| 2013/0320272 | A1 * | 12/2013 | Wu et al. | 252/511 |

FOREIGN PATENT DOCUMENTS

JP 3-273522 * 12/1991

OTHER PUBLICATIONS

U.S. Appl. No. 13/275,255, filed Oct. 17, 2011.

* cited by examiner

*Primary Examiner* — Ana Woodward
(74) *Attorney, Agent, or Firm* — Pillsbury Winthrop Shaw Pittman LLP

(57) ABSTRACT

A coating for an ink jet printhead front face, wherein the coating comprises an oleophobic low adhesion coating having high thermal stability as indicated by less than about 15 percent weight loss when heated to up to 300° C., and wherein a drop of ultra-violet (UV) gel ink or a drop of solid ink exhibits a contact angle of greater than about 45° and sliding angle of less than about 30° with a surface of the coating, wherein the coating maintains the contact angle and sliding angle after the coating has been exposed to a temperature of at least 200° C. for at least 30 minutes. In particular, the coating shows no oil on the coating surface after curing.

19 Claims, 3 Drawing Sheets

THERMALLY STABLE OLEOPHOBIC LOW ADHESION COATING FOR INKJET PRINTHEAD FACE

BACKGROUND

Inkjet printers produce images by jetting or ejecting droplets of liquid ink from an inkjet printhead onto a recording substrate (e.g., paper). The printhead typically has a front face with a nozzle opening defined therein, through which liquid ink is ejected as droplets onto the recording substrate.

The front face of an inkjet printhead can become contaminated by wetting or drooling of ink. Such contamination can cause or contribute to partial or complete blocking of the nozzle opening within the front fact of the inkjet printhead, cause under- or over-sized ink droplets to be ejected from the inkjet printhead, alter the intended trajectory of ejected ink droplets onto the recording substrate, and the like, all of which degrade the print quality of inkjet printers.

The front fact of an inkjet printhead is typically coated with a material such as polytetrafluoroethylene (PTFE) (e.g., Teflon®) or perfluoroalkoxy (PFA), to protect it. Current printheads have good initial performance with solid ink, including those commercially available from Xerox Corporation. However, over the operational lifetime, the performance degrades and ink does not readily slide over the printhead front face coatings at typical ink-ejecting temperatures. Rather, the ink tends to adhere and flow along the printhead front face coating, leaving a residual ink film which can partially or completely block the nozzle opening within the front face of the inkjet printhead. FIG. 1 is a photograph of the front face of an inkjet printhead after a printing run showing wetting and contamination of a solid ink over most of the area of the front face surrounding nozzle openings. Thus, oleophobic low adhesion coatings which prevent drooling failure are important to improve robustness and reliability, provide for new market penetration for future solid inks.

Solid inks are those characterized by being solid at room temperature and molten at an elevated temperature at which the molten ink is applied to a substrate. Solid inks generally comprise an ink vehicle, one or more waxes, an optional colorant, and one or more optional additives such as viscosity modifiers, antioxidant, plasticizer, and the like. UV curable inks generally comprise a photoinitiator package, a curable carrier material, an optional colorant, and one or more optional additives such as viscosity modifiers, dispersant, synergist, and the like. UV curable phase change inks, a subset of UV curable inks, may also include a gellant and optionally a curable wax. The term "curable" refers, for example, to the component or combination being polymerizable, that is, a material that may be cured via polymerization, including, for example, free radical routes, and/or in which polymerization is photoinitiated though use of a radiation sensitive photoinitiator. For example, the curable carrier material may be one or more curable monomers or a curable wax.

Contamination of an inkjet printhead front face can be minimized somewhat by adopting purging and/or wiping procedures. However, these procedures can undesirably consume time and/or use excessive amounts of ink, thereby decreasing the useful life of the inkjet printhead. Contamination of an inkjet printhead front face can also be minimized somewhat by providing an oleophobic low adhesion printhead front face coating that does not wet significantly with ink ejected from nozzle openings of the printhead. When heated to temperatures typically encountered during printhead fabrication processes, however, the surface property characteristics of known oleophobic low adhesion printhead front face coatings degrade to the point that they cannot be relied upon to minimize contamination of the inkjet printhead front face. Hence a thermally stable oleophobic low adhesion coating that does not degrade in surface properties upon exposure to high fabrication temperatures is needed for printheads.

Other oleophobic low adhesion printhead front face coatings found to be thermally stable comprise fluorinated polyurethane and are disclosed in U.S. patent application Ser. No. 13/275,255 filed Oct. 17, 2011 and U.S. Patent Publication No. 2012/0044298, which are hereby incorporated by reference in their entirety. These coatings show good surface properties, such as high contact angle/low slide angle, with inks in stacking and ink aging tests even after exposure to high fabrication temperatures. However, these coatings may be expensive to manufacture and implement in printheads. Also the thermal stability of these coatings (as shown by onset of decomposition temperature in Thermal Gravimetric Analysis (TGA) scans) only slightly above printhead fabrication temperatures of 290° C., and may lead to less reliability and robustness of printhead fabrication steps.

As such, there is desired an alternative to the conventional print head face plate coatings that are used that would avoid the problems described above. The advantages of such a coating would be fewer printhead related defects, longer front face life, and reduced manufacturing costs for producing the coating.

SUMMARY

According to the embodiments illustrated herein, there is provided a novel composition for use in printhead assemblies.

In particular, the present embodiments provide a coating for an ink jet printhead front face, wherein the coating comprises: a functionalized perfluoropolyether polymer; and a polyamic acid, wherein the coating has high thermal stability as indicated by less than about 15 percent weight loss when heated to up to 300° C., and wherein a drop of ultra-violet (UV) gel ink or a drop of solid ink exhibits a contact angle of greater than about 50° and a sliding angle of less than about 30° with a surface of the coating.

In further embodiments, there is provided a process of forming an oleophobic low adhesion coating for an ink jet printhead front face, comprising: coating a reactant mixture comprising a first polyamic acid and a functionalized perfluoropolyether polymer onto a substrate; subjecting the coated reactant mixture to a curing treatment at a first temperature.

In yet other embodiments, there is provided a coating for an ink jet printhead front face, wherein the coating comprises: a dihydroxy functionalized perfluoropolyether compound having a general formula:

$$HO—(CH_2CH_2O)_aCH_2—CF_2O—(CF_2CF_2O)_b—(CF_2O)_cCF_2—CH_2—(OCH_2CH_2)_aOH$$

wherein a is an integer in a range between 0 and 20, and b and c are integers in a range between 0 and 50, provided that at least one of b and c is not zero; and a polyamic acid, wherein the coating has high thermal stability as indicated by less than about 15 percent weight loss when heated to up to 300° C., and wherein a drop of ultra-violet (UV) gel ink or a drop of solid ink exhibits a contact angle of greater than about 50° and a sliding angle of less than about 30° with a surface of the coating.

BRIEF DESCRIPTION OF THE DRAWINGS

For a better understanding of the present embodiments, reference may be had to the accompanying figures.

DETAILED DESCRIPTION

Figure 1:
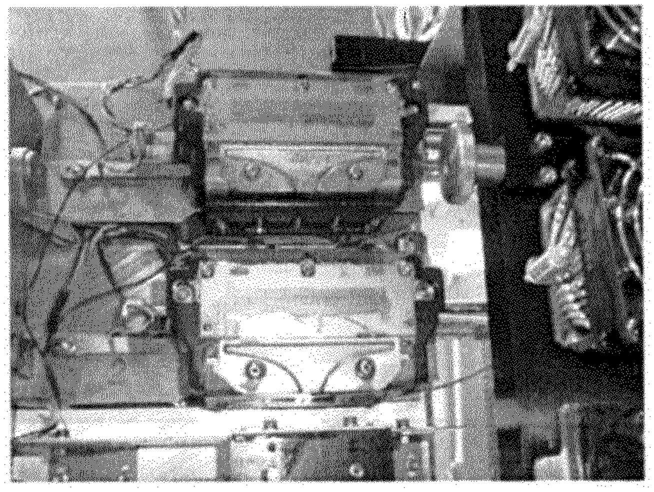
FIG. 1 PRIOR ART
FIG. 1 is a photograph showing contamination of a solid ink over a nozzle area of a printhead having a PTFE coating after a printing run.

In the following description, it is understood that other embodiments may be utilized and structural and operational changes may be made without departure from the scope of the present embodiments disclosed herein.

The present embodiments provide a novel composition for use as a print head face plate coating to avoid many issues faced with conventional face plates, such as drooling or flooding. In addition, the novel composition provides a thermally stable oleophobic low adhesion coating for the printhead frontface. While not being bound by any theory, it is believed that the unique chemistry between the polyamic acid and a functionalized perfluoropolyether polymer provides the desired properties of high contact angle and low sliding angle. "Functionalized" is defined herein as the presence of reactive chemical groups on the polymer, such as hydroxyl (—OH), carboxyl (—COOH), amine (—NH2), silanol (—Si(OR)3), ester (—COOR) or amide (—CONHR), wherein R is an alkyl group. The novel composition can also be used in other inkjet printer components such as, for example, an image transfixing member, paper transport rolls and drums, and fuser rolls and drums.

In particular, the present embodiments provide for a coating composition formed from a polyimide-based system reacted with a functionalized perfluoropolyether polymer, which is incorporated into the coating during the curing step. The coating has a high hexadecane contact angle and low sliding angle.

The adhesion of an ink drop towards a surface can be determined by measuring the sliding angle of the ink drop (i.e., the angle at which a surface is inclined relative to a horizontal position when the ink drop begins to slide over the surface without leaving residue or stain behind). The lower the sliding angle, the lower the adhesion between the ink drop and the surface. As used herein, the term "low adhesion" means a low sliding angle of less than about 30° when measured with ultra-violet curable gel ink or solid ink, with the printhead front face surface.

Embodiments described here include oleophobic low adhesion surface coatings usable for an inkjet printhead front face, wherein the surface coatings comprise an oleophobic low adhesion polymeric material. When an inkjet printhead front face surface has such a coating, jetted drops of ultra-violet (UV) gel ink, referred to also as "UV ink," or jetted drops of solid ink exhibit low adhesion towards the surface coating. The adhesion of an ink drop towards a surface can be determined by measuring the sliding angle of the ink drop, where the sliding angle is the angle at which a surface is inclined relative to a horizontal position when the ink drop begins to slide over the surface without leaving residue or stain behind. The lower the sliding angle, the lower the adhesion between the ink drop and the surface.

In some embodiments, a low sliding angle is less than about 25°, in other embodiments the low sliding angle is less than about 20°, when measured with ultra-violet curable gel ink or solid ink with the printhead front face surface as the surface. In yet other embodiments, a low sliding angle is greater than about 1° when measured with ultra-violet curable gel ink or solid ink, with the printhead front face surface as the surface.

As used here, an oleophobic low adhesion surface coating is "thermally stable" when drops of ultra-violet gel ink or solid ink exhibit low adhesion towards the surface coating after the surface coating has been exposed to high temperatures, such as temperatures in a range between 180° C. and 325° C., or in a range between about 180° C. and about 325° C., and high pressures, such as pressures in a range between 100 psi and 400 psi, or in a range between about 100 psi and about 400 psi) for extended periods of time. Extended periods of time may lie in the range between 10 minutes and 2 hours, or in a range between about 10 minutes and about 2 hours.

In one embodiment, the surface coating is thermally stable after the surface coating has been exposed to a temperature of or about 290° C. at pressures of or about 350 psi 300 for about 30 minutes. The surface coating can be bonded to a stainless steel aperture brace at high temperature and high pressure without any degradation. Therefore the resulting printhead can prevent ink contamination because ink droplets can roll off the printhead front face, leaving behind no residue.

In some embodiments, a printing apparatus includes an inkjet printhead having a front face and an oleophobic low adhesion surface coating disposed on a surface of the front face. The oleophobic low adhesion surface coating includes an oleophobic low adhesion polymeric material configured such that jetted drops of ultra-violet gel ink or jetted drops of solid ink exhibit a contact angle greater than or about 45°. In one embodiment, jetted drops of ultra-violet gel ink or jetted drops of solid ink exhibit a contact angle greater than or about 55°. In another embodiment, jetted drops of ultra-violet gel ink or jetted drops of solid ink exhibit a contact angle greater than or about 65°. In one embodiment, there is no upper limit to the contact angle exhibited between the jetted drops of ultra-violet gel ink or jetted drops of solid ink and the surface coating. In another embodiment, the jetted drops of ultra-violet gel ink or jetted drops of solid ink exhibit a contact angle less than or about 150°.

In yet another embodiment, the jetted drops of ultra-violet gel ink or jetted drops of solid ink exhibit a contact angle less than or about 90°. When ink is filled into the printhead, it is desired to maintain the ink within the nozzle until it is time to eject the ink. Generally, the greater the ink contact angle the better, meaning higher, the drool pressure. Drool pressure relates to the ability of the aperture plate to avoid ink weeping out of the nozzle opening when the pressure of the ink tank or the reservoir increases. Maintaining a higher pressure without weeping allows for faster printing when a print command is given.

In some embodiments, the coatings are thermally stable and provide this property even after exposure to high temperatures, such as temperatures in a range between 180° C. and 325° C., or in a range between about 250° C. and about 300° C., and high pressures, such as pressures in a range between 100 psi and 400 psi, or in a range between about 200 psi and about 350 psi, for extended periods of time, between 10 minutes and 2 hours, or in a range between about 30 min and about 60 min. This maintains high drool pressures.

In one embodiment, the coatings are thermally stable and provide this property even after exposure to a temperature of or about 290° C. at pressures of or about 300 psi for or about 30 minutes, allowing maintenance of high drool pressures. Advantageously, the oleophobic low adhesion surface coatings described herein provide, in combination, low adhesion and high contact angle for ultra-violet curable gel ink and solid ink, which further provides the benefit of improved drool pressure or reduced or eliminated weeping of ink out of the nozzle.

In some embodiments, the oleophobic low adhesion surface coating is a reaction product of a reactant mixture that includes at least a polyimide precursor (polyamic acid) and a functionalized perfluoropolyether polymer.

Suitable polyamic acids include the polyamic acids formed by reaction between a dianhydride and a diammine. In some embodiments, the polyamic acid is formed by reaction between pyromellitic dianhydride and 4,4-oxydianiline. In some embodiments, the polyamic acid are Pyre ML series purchased from Industrial Summit Technology, USA, e.g. RC 5019, RC-5057, RC-5069, RC-5097, RK-692, RC-5083, and T-8585. In some embodiments, the polyamic acid is formed by reaction between a dianhydride and a diisocyanate.

Suitable perfluoropolyether compounds include mono- or di-hydroxyl functionalized monomeric, oligomeric, and polymeric perfluoropolyether compounds. Examples of suitable dihydroxy functionalized perfluoropolyether compounds include (but are not limited to) those of the general formula:

$$X—(CH_2CH_2O)_aCH_2—CF_2O—(CF_2CF_2O)_b—(CF_2O)_cCF_2—CH_2—(OCH_2CH_2)_a—X$$

wherein a is an integer in a range between 0 and 20, and b and c are integers in a range between 0 and 50, provided that at least one of b and c are not zero, and X is a functional end group such as hydroxyl (—OH), carboxylic acid (—COOH), ester (—COOR) or amide (—CONHR), wherein R is an alkyl group with general formula $C_nH_{2n+1}$, where n is an integer from 1 to 50. In one embodiment, a suitable di-functionalized perfluoropolyether compound is Fluorolink-D which can be represented by the formula:

$$HOCH_2CF_2O(CF_2CF_2O)_b(CF_2O)_cCF2CH_2OH$$

In some embodiments, suitable dihydroxy functionalized perfluoropolyether compounds may be obtained under the name Fluorolink®, for example, Fluorolink C®, Fluorolink D®, Fluorolink D10®, Fluorolink D10H®, Fluorolink E10®, Fluorolink E10H®, Fluorolink A10®, available from Solvay Solexis S.p.A. (Milan, Italy), or the like or mixtures thereof. In one embodiment, a suitable di-functionalized perfluoropolyether compound is Fluorolink C which can be represented by the formula:

$$HOOC—CH_2CF_2O(CF_2CF_2O)_b(CF_2O)_cCF2CH_2COOH$$

In embodiments, the polyamic acid and perfluoropolyether compound are reacted in a weight ratio of from about 100 to about 1 or from about 10 to about 1, or from about 1 to about 1. In further embodiments, the perfluoropolyether is present in an amount of from about 1 to about 50 percent by weight, or from about 10 to about 20 percent by weight, or from about 30 to about 50 percent by weight of the total weight of the cured coating composition. In such embodiments, the polyimide resin is present in an amount of from about 99 to about 50 percent by weight, or from about 90 to about 80 percent by weight, or from about 70 to about 50 percent by weight of the total weight of the cured coating composition.

When coated onto the front face of an inkjet printhead, the oleophobic low adhesion surface coating exhibits a sufficiently low adhesion with respect to the inks that are ejected from the inkjet printhead such that ink droplets remaining on the oleophobic low adhesion coating can slide off the printhead in a simple, self-cleaning manner. Contaminants such as dust, paper particles, etc., which are sometimes found on the front face of inkjet printheads, can be carried away from the inkjet printhead front face by a sliding ink droplet. The oleophobic low adhesion printhead front face coating can provide a self-cleaning, contamination-free inkjet printhead. The coating also exhibits a shelf life of from about 1 to about 500 days.

As used herein, the oleophobic low adhesion coating can exhibit a "sufficiently low wettability" with respect to inks that are ejected from an inkjet printhead when a contact angle between an ink and the oleophobic low adhesion coating is, in one embodiment, greater than about 45° and in another embodiment greater than about 55°.

The oleophobic low adhesion coating disclosed herein can be employed as an oleophobic low adhesion printhead front face coating for an inkjet printhead of any suitable inkjet printer, such as continuous inkjet printers, thermal drop-on-demand (DOD) inkjet printers, and piezoelectric DOD inkjet printers. As used here, the term "printer" encompasses any apparatus, such as a digital copier, bookmaking machine, facsimile machine, multi-function machine, and the like, which performs a print outputting function for any purpose.

The oleophobic low adhesion coating disclosed herein can be employed as an oleophobic low adhesion printhead front face coating for an inkjet printhead configured to eject any suitable ink such as, aqueous inks, solvent inks, UV-curable inks, dye sublimation inks, solid inks, etc. An exemplary inkjet printhead suitable for use with the oleophobic low adhesion coating disclosed herein is described with respect to FIG. 2.

Figure 2:
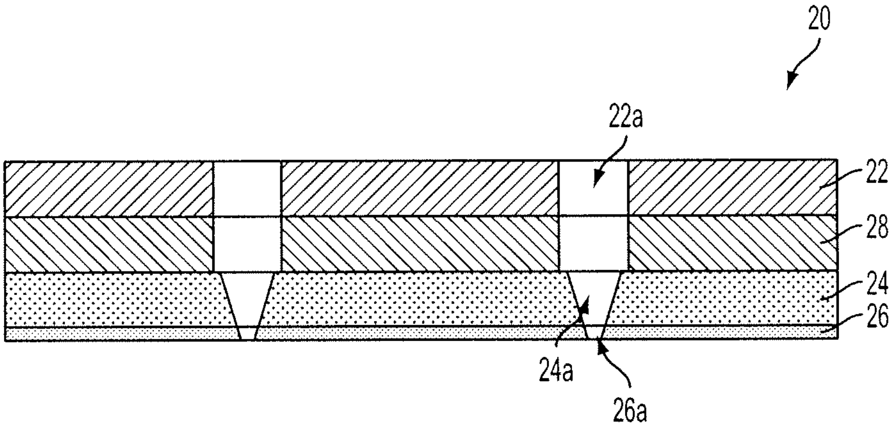
FIG. 2 is a cross-sectional view of an inkjet printhead according to the present embodiments.

A typical inkjet printhead may include a nozzle plate typically bonded to a support brace. FIG. 2 shows an embodiment of a printhead jet stack having an anti-wetting coating. In this embodiment, an oleophobic, low adhesion coating 26 is bonded to a nozzle plate 24. The nozzle plate may be a polymer film, such as a polyimide film, bonded to an aperture support brace 22.

The support brace 22 is formed of any suitable material such as stainless steel and include apertures **22*a* defined therein. The apertures 22*a* may communicate with an ink source (not shown). The nozzle plate 24 may be formed of any suitable material such as polyimide and include nozzles 24*a* defined therein. The nozzles 24*a* may communicate with the ink source via the apertures 22*a* such that ink from the ink source is jettable from the printhead 20 onto a recording substrate through a nozzle 24*a***.

In the illustrated embodiment, the nozzle plate 24 is bonded to the support brace 22 by an intervening adhesive material 28. The adhesive material 28 may be provided as a thermoplastic adhesive can be melted during a bonding process to bond the nozzle plate 24 to the support brace 22. Typically, the nozzle plate 24 and the oleophobic low adhesion coating 26 are also heated during the bonding process. Depending on the material from which the thermoplastic adhesive is formed, bonding temperature can be in a range between 180° C. and 325° C.

Conventional oleophobic low adhesion coatings tend to degrade when exposed to temperatures encountered during typical bonding processes or other high-temperature, high pressure processes encountered during fabrication of inkjet printheads. However, the oleophobic low adhesion coating 26 disclosed herein exhibits a sufficiently low adhesion (indicated by low sliding angles) and high contact angle with respect to an ink after it has been heated to the bonding temperature. The oleophobic low adhesion coating 26 can provide a self-cleaning, contamination-free inkjet printhead 20 with high drool pressure. The ability of the oleophobic low adhesion coating 26 to resist substantial degradation in desirable surface properties (e.g., including low sliding angle and high contact angle) upon exposure to elevated temperatures enables inkjet printheads having self-cleaning abilities while maintaining high drool pressure, to be fabricated using high-temperature and high pressure processes.

In one embodiment, the oleophobic low adhesion coating 26 may be formed on the substrate 32 by initially applying the reactant mixture that, as described above, includes at least a polyamic acid and at least one perfluoropolyether compound. After the reactant mixture is applied to the substrate 32, the reactants are reacted together to form the oleophobic low adhesion coating 26. The reactants can be reacted together by, for example, curing the reactant mixture. In one embodiment, the reactant mixture is first cured at a temperature of about 130° C. for about 30 minutes to 2 hours followed by a high temperature post-cure at about 290° C. for about 30 minutes to 2 hours.

In one embodiment, the reactant mixture may be applied to the substrate 32 using any suitable method such as die extrusion coating, dip coating, spray coating, spin coating, flow coating, stamp printing, and blade techniques. An air atomization device such as an air brush or an automated air/liquid spray can be used to spray the reactant mixture. The air atomization device can be mounted on an automated reciprocator that moves in a uniform pattern to cover the surface of the substrate 32 with a uniform or substantially uniform amount of the reactant mixture. The use of a doctor blade is another technique that can be employed to apply the reactant mixture. In flow coating, a programmable dispenser is used to apply the reactant mixture.

The inks described herein are further illustrated in the following examples. All parts and percentages are by weight unless otherwise indicated.

It will be appreciated that several of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Coating 1

For the evaluation of oleophobic low adhesion coatings on potential inkjet printhead front face substrates, coatings were prepared as follows. In a typical experiment, 15 g of commercially available Pyre RC 5019 (polyamic acid of pyromellitic dianhydride/4,4-oxydianiline) was diluted to about 5% solid concentration with N-methyl pyrollidone (NMP) in a RB flask. Then 4.7 g of FLUOROLINK C was added to the flask, and the contents were stirred under argon at 55 C for 4 hours. The resulting coating formulation was flow coated on polyimide substrate using CDMG flow coater. The wet film was then cured to complete the imidization step in oven using the following protocol: 150° C. for 45 min, 190° C. for 1 hour and 290° C. for 1 hour. These coatings are called "PI-FLK" herein.

Example 2

Comparative Coating 23.4 grams of Fluorolink-D was added to a 3 neck round bottom flask fitted with an addition funnel, a temperature probe and a condenser. 135 mL of Novec 7200, 95 mL of ethyl acetate and 0.211 grams of dibutyltin dilaurate catalyst were added to the 3 neck round bottom flask, and the contents were stirred and heated to a gentle reflux (~71° C.) under a nitrogen atmosphere. A second solution was prepared by dissolving 5.04 grams of Desmodur 3790 in 185 mL of ethyl acetate and 63 mL of Novec 7200. This isocyanate solution was then transferred to the addition funnel connected to the round bottom flask, and was added dropwise to the Fluorolink solution over a 2-hour period at 71° C. The resulting mixture was then stirred at 71° C. overnight. It was then cooled to room temperature and was filtered using a Millipore Opticap XL filter (pore size 0.2 microns) to yield the product solution. The solid concentration of the product solution was about 4-5%.

The product solution was diluted to about 3% solid by adding Novec 7200. The diluted solution was transferred to a round bottom flask and it was concentrated to about 12% solid concentration by distillation using a vigreaux distillation apparatus. The concentrated solution after cooling to room temperature was coated onto a polyimide substrate using a drawbar coater. The coated film was air dried for 5 minutes and then heat-cured in an oven using two sequential curing steps as follows: the air dried film was placed in oven at 150° C. for 30 minutes ($1^{st}$ cure) and then at 260° C. for 30 minutes ($2^{nd}$ cure) to produce the comparative coating. Coatings were evaluated for film quality and surface properties towards inks as described next.

Testing

Contact angle and sliding angle of the coatings were determined on an OCA20 goniometer from Dataphysics. In a typical static contact angle measurement, about 10 microliter of solid ink (at typical ink jetting temperature of 115° C.) was gently deposited on the surface of the coating and the static angle was determined by the computer software (SCA20). Each reported data is an average of >5 independent measurements. Sliding angle measurement was done by tilting the base unit at a rate of 1°/sec with an about 10 microliter droplet of solid ink. The sliding angle is defined as the inclination angle at which the test drops began to slide. An offline test, so called stacking, was used to simulate adhesive bonding during printhead fabrication. Typically the coating was subjected to a high pressure and high temperature stress, e.g., at 290° C. at 350 psi for 30 min and the contact angle and sliding angle afterward were measured.

Ink aging experiment was designed as an accelerated test to simulate the functional life of the coating. The experiment was performed by immersing the coating after stacking in a molten solid ink (equal parts of cyan, magenta, yellow and black ink) at 140° C. for 2 days. The contact angle and sliding angle after ink aging were determined as described before.

Figure 3:
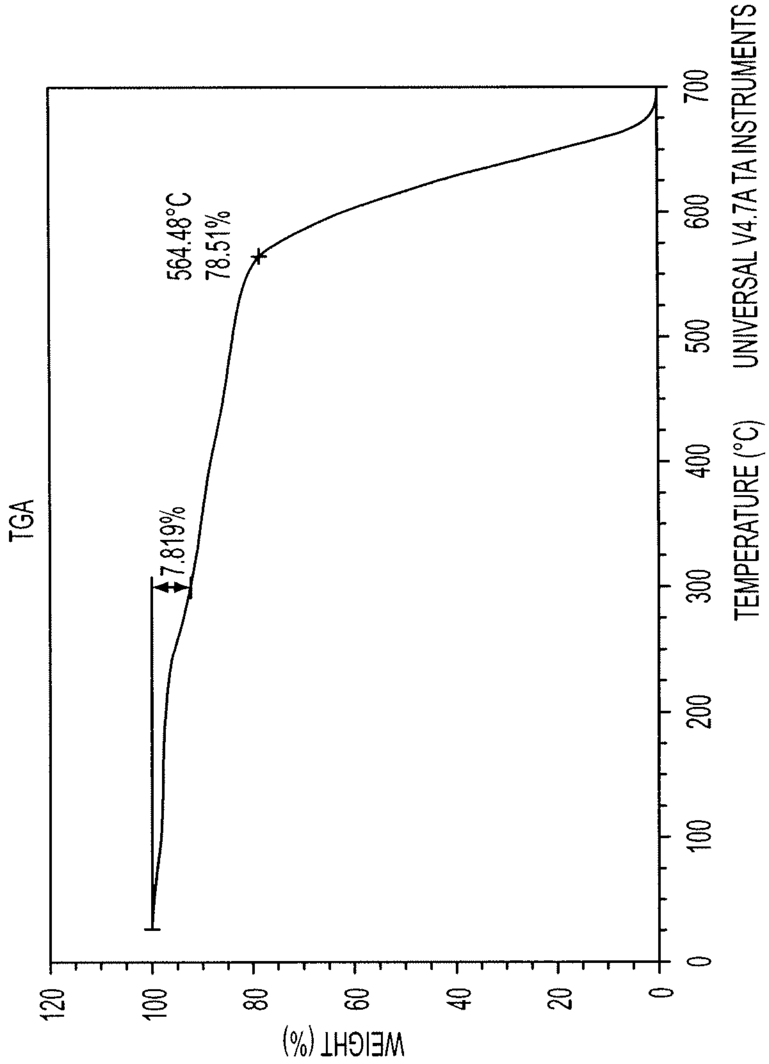
FIG. 3 is a graph illustrating the thermal stability of a thermally stable oleophobic low adhesion coating according to the present embodiments.
Figure 4:
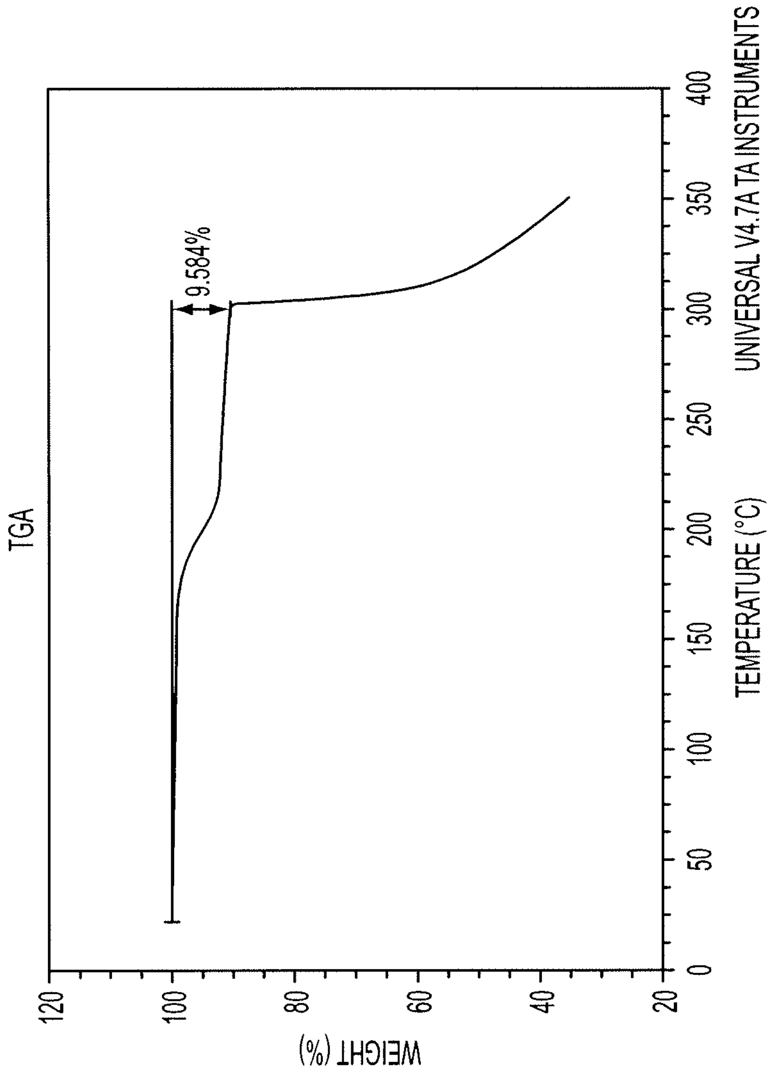
FIG. 4 is a graph illustrating the thermal stability of a comparative low adhesion coating.

Thermal Gravimetric Analysis (TGA) decomposition profile in air also confirmed the extremely high thermal stability of these coatings, as seen in FIGS. 3 and 4. TGA weight loss profiles in air for comparison of thermal stability of PI-FLK and a comparative low adhesion coating demonstrated that the PI-FLK coatings had much higher thermal stability as indicated by lower 30-300° C. weight loss % and much higher final decomposition temperature.

Cured coatings were also evaluated for surface property towards solid ink. Results are shown in Table 1 below. Contact angle and sliding angle units are in degrees.

TABLE 1

Table 1. Surface properties of coatings after various stress conditions

| Coating | TGA weight loss % between 30-300° C. range (Onset of major decomposition) | Initial (after curing) Contact angle | Initial (after curing) Sliding Angle | Stacking (290° C. at 350 psi for 30 min) Contact angle | Stacking (290° C. at 350 psi for 30 min) Sliding Angle | Stacking + Inking (290° C. at 350 psi for 30 min followed by CYMK ink soak at 140° C. for 2 days) Contact angle | Stacking + Inking (290° C. at 350 psi for 30 min followed by CYMK ink soak at 140° C. for 2 days) Sliding Angle |
|---|---|---|---|---|---|---|---|
| PI-FLK | 7% (565° C.) | 71 | 21 | 67 | 25 | 61 | 25 |
| Comparative Coating | 10% (305° C.) | 77 | 8 | 68 | 8 | 65 | 19 |

As can be seen, the surface property of PI-FLK coatings is comparable to Comparative Coating. PI-FLK coatings maintained high contact angle after stacking conditions (290° C./350 PSI) which simulate press adhesive bonding cycles of PH fabrication. Also stacked coatings maintained high contact angle after 2 days/140° C./CYMK ink aging. The sliding angles were somewhat higher than Comparative Coating, but still low enough to facilitate easy cleaning. Also notably, ink drops did not leave residue behind after sliding off, which suggests that ink may be wiped off cleanly by wiper blade during PH maintenance cycles. Lastly, but most importantly, the thermal stability of these coatings is exceptional as shown by TGA results. These coatings show onset of decomposition at 565° C. and this affords greater latitude in the printhead fabrication steps.

SUMMARY

Thus, the present embodiments provide coatings which have very high thermal stability while maintaining desired surface properties (e.g., high ink contact angle and low sliding angle) and also show no oil on the surface after curing. As such, the present embodiments offer simpler manufacturing path and lower manufacturing cost.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. An oleophobic low adhesion coating for an ink jet printhead front face, wherein the coating comprises:

a) a perfluoropolyether compound having a formula:

$$X—(CH2CH2O)_aCH2\text{-}CF2P\text{-}(CF2CF2O)_b—(CF2O)_cCF2\text{-}CH2\text{-}(OCH2CH2)_a—X$$

wherein a is an integer in a range between 0 and 20, and b and c are integers in a range between 0 and 50, provided that at least one of b and c is not zero, and X is a functional end group selected from the group consisting of hydroxyl (—OH), carboxyl (—COOH), amine (—NH2), silanol (—Si(OR)3), ester (—COOR) and amide (—CONHR), wherein R is an alkyl group; and b) a polyamic acid that is formed by reaction between a dianhydride and a diamine;

wherein a drop of ultra-violet (UV) gel ink or a drop of solid ink exhibits a contact angle of greater than 65° and a sliding angle of less than about 30° when measured at a surface of the coating at a temperature of 115° C., and wherein the coating has high thermal stability as indicated by less than about 15 percent weight loss when heated to 330° C.

2. The coating of claim 1, wherein the coating maintains the contact angle and sliding angle with the drop of ultra-violet (UV) gel ink or the drop of solid ink after the coating has been exposed to a temperature of 290° C. and a pressure of at least 350 psi.

3. The coating of claim 1, wherein the coating maintains the contact angle and the sliding angle with the drop of ultra-violet (UV) gel ink or the drop of solid ink after the coating has been exposed to a temperature of up to 200° C. for at least 30 minutes.

4. The coating of claim 1, wherein the drop of ultra-violet (UV) gel ink or the drop of solid ink exhibits a sliding angle of less than about 20° when measured at the surface of the coating at a temperature of 115° C.

5. The coating of claim 1, wherein the coating maintains the contact angle with the drop of ultra-violet (UV) gel ink or the drop of solid ink after the oleophobic low adhesion coating has been exposed to a temperature of up to 330° C. for at least 30 minutes.

6. The coating of claim 1, wherein the contact angle is greater than about 70° when measured at the surface of the coating at a temperature of 115° C.

7. The coating of claim 1, wherein R is an alkyl group with the formula $C_nH_{2n+1}$ and n is an integer from 1 to 50.

8. The coating of claim 1, wherein the perfluoropolyether compound is present in an amount of from about 1 to about 50 percent by weight of the total weight of the coating.

9. The coating of claim 8, wherein the perfluoropolyether compound is present in an amount of from about 10 to about 20 percent by weight of the total weight of the coating.

10. The coating of claim 1, wherein the polyamic acid is present in an amount of from about 99 to about 50 percent by weight of the total weight of the coating.

11. The coating of claim 10, wherein the polyamic acid is present in an amount of from about 90 to about 80 percent by weight of the total weight of the coating.

12. The coating of claim 1, wherein the coating maintains the contact angle and the sliding angle with the drop of ultraviolet (UV) gel ink or the drop of solid ink after the coating has been soaked in molten solid ink or UV gel ink at a temperature in a range between 120° C. and 150° for 2 days.

13. The coating of claim 1, wherein the coating maintains the contact angle and the sliding angle with the drop of ultraviolet (UV) gel ink or the drop of solid ink after the coating was exposed to a temperature of 300° C. at a pressure of 400 psi for 10 minutes.

14. The coating of claim 1 exhibiting a shelf life of from about 1 to about 500 days.

15. The coating of claim 1, wherein X is hydroxyl (—OH).

16. The coating of claim 1, wherein X is a carboxyl (—COOH).

17. The coating of claim 1, wherein X is an ester (—COOR) or an amide (—CONHR).

18. The coating of claim 1, wherein the dianhydride is pyromellitic dianhydride.

19. The coating of claim 1, wherein the diamine is 4,4-oxydianiline diamine.

* * * * *